United States Patent [19]
Dingwall et al.

[11] 3,714,638
[45] Jan. 30, 1973

[54] CIRCUIT FOR IMPROVING OPERATION OF SEMICONDUCTOR MEMORY

[75] Inventors: Andrew Gordon Francis Dingwall, Somerville, N.J.; John Mulliner Jorgensen, Santa Clara, Calif.

[73] Assignee: RCA Corporation, Somerville, N.J.

[22] Filed: March 24, 1972

[21] Appl. No.: 237,749

[52] U.S. Cl. ..........340/173 R, 340/173 FF, 307/260, 307/264

[51] Int. Cl. ..........G11c 11/40

[58] Field of Search ..........340/173 R, 173 FF, 174 M; 307/260, 264

[56] References Cited

UNITED STATES PATENTS 3,641,511 2/1972 Cricchi ..........340/173 FF

*Primary Examiner*—Terrell W. Fears
*Attorney*—H. Christoffersen et al.

[57] ABSTRACT

A pair of cross-coupled transistors connected to the two sense lines of an array of memory cells clamp one sense line to a low signal level in response to a high signal level on the other sense line.

9 Claims, 2 Drawing Figures

CIRCUIT FOR IMPROVING OPERATION OF SEMICONDUCTOR MEMORY

BACKGROUND OF THE INVENTION

In the semiconductor memories of interest in this application, each memory cell produces an output signal Q and its complement $\overline{Q}$. The Q terminal of a cell is coupled to one column conductor by a first single transistor transmission gate and the $\overline{Q}$ terminal is coupled to a second column conductor by a second single transistor transmission gate. There are a plurality of pairs of column conductors and one conductor of each pair may be coupled to one sense line and the other to a second sense line. Each coupling may be via a single transistor transmission gate. The transmission gates, in each case, are bidirectional.

The use of single transistor transmission gates introduces problems during the memory read (sensing)cycle. The terminal of a selected memory cell which is at a given voltage (e.g., low) connects to one sense line via two series connected transmission gates operating in the "source follower" mode. For reasons to be discussed later, when operated in this way these transmission gates may assume a relatively high value of impedance and this may permit the sense line voltage to assume a value different than that at the cell output terminal. If the voltage at this poorly "clamped" sense line should exceed a given level, the signal on that line will be interpreted to represent the same binary value as the signal on the other sense line and an erroneous read operation will result.

The problem above can be solved by using complementary rather than single transmission gates for coupling each cell to the columns. Each complementary gate comprises two transistors of complementary conductivity type, the conduction paths of which are connected in parallel. This gate exhibits a low impedance conduction path, regardless of the polarity of the signal applied to the gate; however, its use requires two additional transistors per memory cell. This means more area is occupied by each cell resulting in fewer cells per "chip".

Another not entirely successful solution to the problem is illustrated in dashed box 10 of FIG. 1. Transistors ($D_{1S}$, $D_{2S}$, $D_{1A}$, $D_{1B}$, $D_{2A}$ and $D_{2B}$) are connected to the sense lines (1, 2) and to the column (digit) line ($Y_{ja}$, $Y_{jb}$). Prior to read-out, a pulse is applied to the gate electrode 24 of the transistors for turning them on and thereby placing the digit and sense lines at ground. It was believed that setting all the lines to the zero level just prior to read out would prevent the occurrence of erroneous read outs, since it was believed that the uncharged lines coupled to the memory cell output terminals carrying the "low" signals would remain uncharged while the lines coupled to the memory cell output terminals carrying the "high" signals would be quickly clamped to the high level.

It was soon discovered, however, that when the read out time was long, erroneous data was sensed. That is, during a long read out cycle, the binary information on one sense line would change state. It also was discovered that any decrease in the operating potential increased the number of erroneous outputs and that temperature variations caused the memory array to operate incorrectly.

SUMMARY OF THE INVENTION

The present invention resides, in part, in the discovery of why in the environment discussed above, discharging the sense lines of a memory array prior to read out does not prevent voltage variations on one of the sense lines. The present invention resides also, in part, in the recognition that one output terminal of each memory cell is tightly coupled to its sense line and produces a well defined signal level on that line and in the use of this property for the solution to the sensing problem.

A circuit embodying the invention includes means responsive to the well defined signal level on one sense line of a semiconductor memory for clamping the other sense line to a second, well defined signal level.

BRIEF DESCRIPTION OF THE DRAWINGS

In the accompanying drawings, like reference characters denote like components.

DETAILED DESCRIPTION OF THE INVENTION

Figure 1:
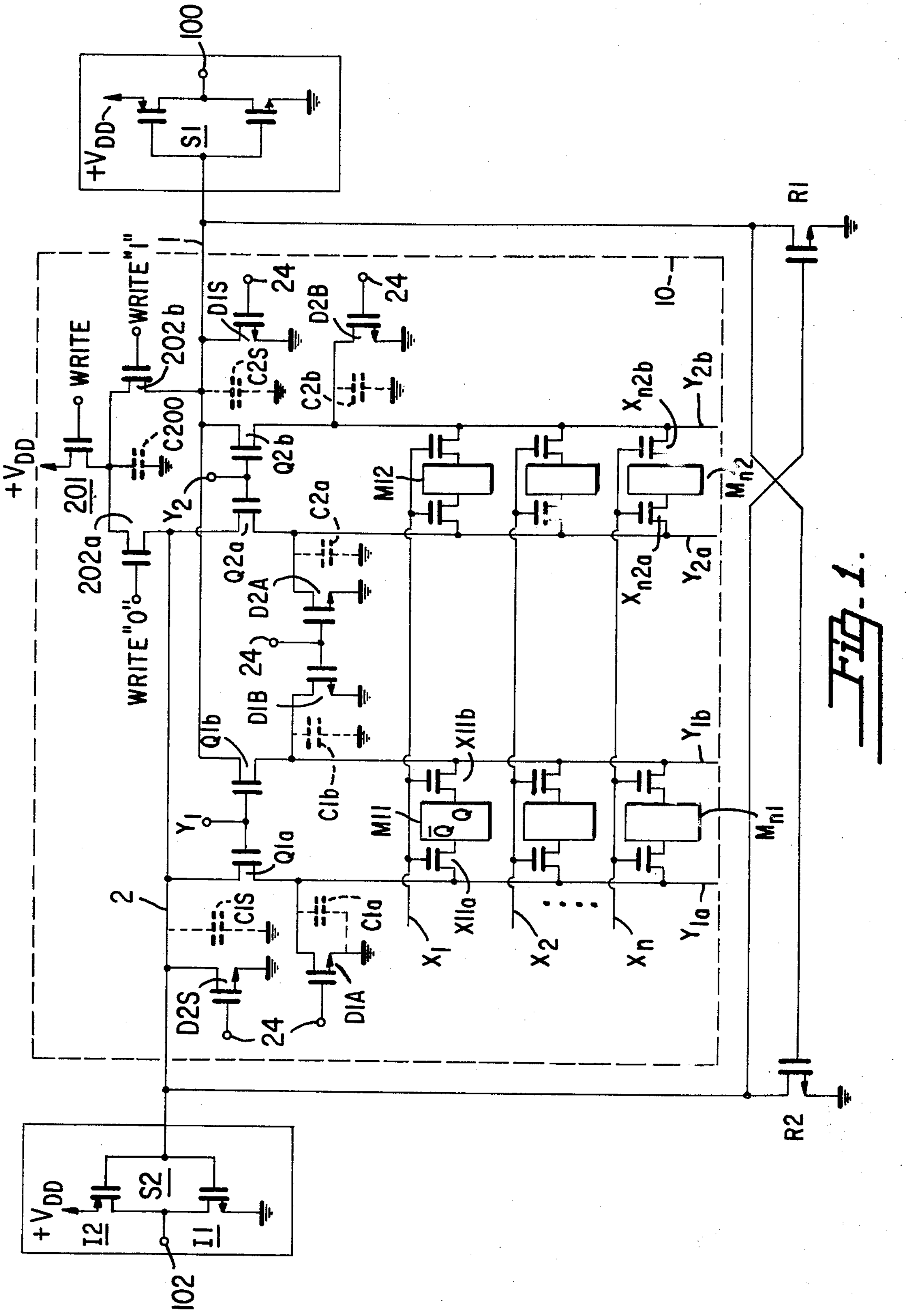
FIG. 1 is a schematic drawing of a memory array circuit embodying the invention.

In the circuit of FIG. 1, transistors R1 and R2 are cross coupled to form a flip-flop for selectively clamping the sense lines (1, 2) of a memory array shown in dashed box 10. The gate of transistor R1 and the drain of transistor R2 are connected to sense line 2. The gate of transistor R2 and the drain of transistor R1 are connected to sense line 1. The sources of transistors R1 and R2 are returned to ground potential.

Understanding the contribution of the present invention requires a detailed explanation of problems discovered by the Applicant when testing and operating the prior art circuit shown in box 10.

The prior art system includes an array of memory cell M*ij* where *i* defines the order of the row and *j* defines the order of the column. There are two digit (Y) lines (Y*ja*, Y*jb*) per column and one X line per row. A cell of the array is selected (addressed) for write-in or read-out by turning on its associated X and Y transistors. Each cell has an output terminal Q for producing an output signal also designated Q and a second output terminal $\overline{Q}$ for producing the complementary signal $\overline{Q}$. The two terminals of each cell are connected through the conduction paths of single transmission gate transistors, X*ija* and X*ijb*, respectively, to the corresponding Y*ja* and Y*jb* lines. Thus, terminal $\overline{Q}$ of cell M11 is connected by means of transistor X11*a* to line Y1*a* and terminal Q of the same cell is connected by means of transistor X11*b* to line Y1*b*.

Each of the Y lines has associated therewith some distributed capacitance denoted by C*ja* or C*jb*. This capacitance may be relatively large since a large number of rows may be connected to the line. The sense lines 1 and 2 are connected to the input terminals of sense amplifiers S1 and S2, respectively, which produce complementary sense signals at terminals 100 and 102. The sense amplifiers may be any one of a well known group of voltage responsive amplifiers and are illustrated here as complementary inverters.

Writing into a cell is accomplished by means of transistors 201, 202*a* and 202*b*. Transistor 201 is connected at its source to $V_{DD}$ and at its drain to the sources of transistors 202*a* and 202*b*. The drains of transistors 202*a* and 202*b* are connected, respectively, to sense lines 1 and 2.

In the circuit of FIG. 1, a memory cell (M*ij*) is selected for write-in or read-out by the appropriate choice of X*i* and Y*j* signals. For example, memory cell M11 is selected by the application of negative going ($+V_{DD}$ volts to zero volts) pulses to the X1 line and to the Y1 line (the line connected to the gate electrodes of transistors Q1*a* and Q1*b*). These pulses turn on P-type transistors X11*a*, X11*b* and P-type transistors Q1*a* and Q1*b* coupling the Q and $\overline{Q}$ terminals of memory cell M11 to sense lines 1 and 2, respectively.

Information is written into a selected cell by the application of write pulse to the gate of transistor 201 during the time the X and Y signals are present. A "1" or a "0" is written into the cell by selectively energizing either transistor 202*a* or 202*b*. Turning on transistor 202*b* causes the Q (*b*) side of the selected memory cell to go "high"—at or near $V_{DD}$ volts. This arbitrarily is defined as writing or storing a logic "1" into the cell. Alternatively, turning on transistor 202*a* causes the $\overline{Q}$ (*a*) side of the flip flop to go high, (Q side goes low—at or near zero volts). This arbitrarily is defined as writing a logic "0" into the cell.

Figure 2:
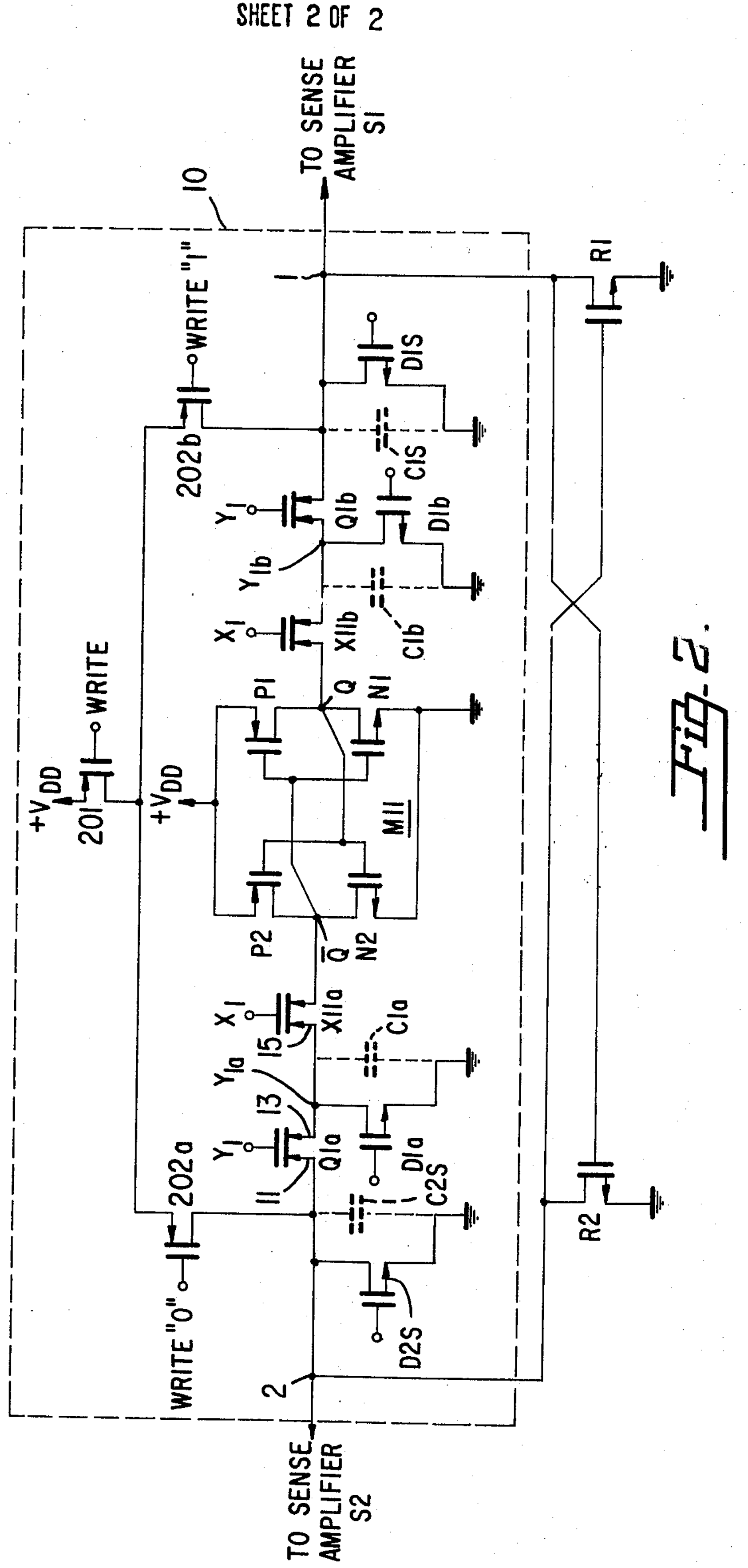
FIG. 2 is a schematic drawing detailing one memory cell in a circuit embodying the invention.

FIG. 2 illustrates the connections seen by each cell of the memory array. For ease of explanation, the connections for cell M11 are shown. Referring to FIG. 2, it is seen that when Q is "high" P-type transistor P1 and N-type transistor N2 are turned on. This causes the Q output terminal to be clamped to $+V_{DD}$ and the $\overline{Q}$ output terminal to be clamped to ground potential. When Q is low, $\overline{Q}$ is high and transistors P2 and N1 are turned on while P1 and N2 are turned off.

Assume for the explanation to follow that the Q output signal of cell M11 is high ($+V_{DD}$) and that the $\overline{Q}$ output signal of cell M11 is low (zero volts). Information stored in the cell is read out or sensed by turning on addressing transistors X11*a*, X11*b*, column transistors Q1*a* and Q1*b* and by sensing the potential developed on sense lines 1 and 2.

The row addressing transistor (X11*b*) and column addressing transistor (Q1*b*) connected between the Q terminal (which produces a high signal) and sense line 1, conduct in the common source mode. Thus the source-drain paths of transistors Q1*b* and X11*b*, connected in series, provides a low impedance between the Q terminal and sense line 1. The $+V_{DD}$ volts present at Q is efficiently transferred with little voltage drop to sense line 1. Therefore, the "high" level is tightly coupled to sense line 1 and a well defined "high" level is applied thereto.

However, the addressing transistors, column transistor Q1*a* and row transistor X11*a*,connected between $\overline{Q}$ the terminal (which is at a low ground potential) and sense line 2 operate in the source follower mode. They tend to conduct conventional current from sense line 2 to terminal $\overline{Q}$. Transistor X11*a* conducts in a direction to clamp digit line Y1a to $\overline{Q}$ ( ≈ zero volts) and transistor Q1*a* conducts in a direction to clamp sense line 2 to line Y1*a*. Electrode 15 functions as the source electrode of transistor X11*a* and electrode 11 functions as the source electrode of transistor Q1*a*. However, a transistor operated in the source follower mode cuts off when its gate-to-source potential decreases below a given threshold ($V_T$) level. (By way of example, $V_T$ may be in the range of 1 to 5 volts). For example, though the gate and drain electrodes of transistor X11*a* may be at zero volts, its source electrode (line Y1*a*) will be at $V_T$ volts above ground potential.

Even if the potential on line Y1a initially is at zero volts, that potential can rise to a value of $V_T$ volts before transistor X11*a* conducts. This is equivalent to saying that for values of potential of less than $V_T$ volts, the transistor appears as a high impedance. It is also evident that transistor X11*a* does not clamp line Y1*a* to the value of signal present at the $\overline{Q}$ output but rather to some potential which is $V_T$ volts above the level present at $\overline{Q}$.

Transistor Q1*a* also conducts in the manner described for transistor X11*a*. The conduction path of transistor Q1*a* is in series with transistor X11*a* and measurements have shown that the potential on sense line 2 can have a value between $V_T$ and $2 \times V_T$ of the addressing transistors.

The threshold voltage offset problem is further increased and complicated by the substrate bias effect. That is, whereas the common substrate of the addressing transistors Q1*a*, X11*a* is returned to the $+V_{DD}$ potential, their source potentials are at a much lower value of voltage. This causes a reverse bias between the source and substrate of these transistors which increases their threshold voltage. As a result, the potential on sense line 2 may rise to a value above that of the threshold of sense amplifier S2, producing an erroneous output at terminal 102.

N-type transistor I1 (FIG. 1) of sense amplifier S2 is cut off for values of potential on sense line 2 which are below the $V_T$ of transistor I1. However, when the potential on sense line 2 exceeds the $V_T$ of transistor I1, it turns on. This occurs even if $\overline{Q}$ is at or near ground potential.

The read out errors are thus due to the fact that the low side of the memory cell is not tightly coupled to the digit line. This allows the associated sense line to rise in potential giving an erroneous indication of the binary information stored in the memory cell.

It was originally thought that the addition of transistors for placing the sense and Y lines at zero volts prior to read out would solve the problem of erroneous read-out. It was believed that once these lines were set to zero volts, they would remain at or close to zero volts during read out. The addition of discharging transistors, however, did not solve the problem for, among others, the following reasons.

1. In order to increase the speed of the memory array system it is desirable to set up the write conditions during the on going read cycle by turning on either transistor 202*a* or 202*b* prior to the actual write. The turn on of either one of these transistors, however, causes a problem. For, associated with the source of transistor 202*a* and 202*b* is a capacitor C200 which is normally charged to $+V_{DD}$ volts. Turning on transistor 202*a* or 202*b* causes this capacitor to be discharged into either sense line 1 or 2. Now, if the sense line into which the capacitor C200 is discharged is not positively clamped to the low level, the sense line potential can rise causing the two output signals of the memory cell to appear high.

2. Leakage through the X or Y address transistors or through the write transistors even though in the sub-microampere range causes the potential on the "unclamped" sense line to rise. The capacitance of the sense lines is relatively small and even low leakage levels quickly cause the potential on these lines to rise above the response level of the sense amplifiers.

3. Under various temperature conditions there is a certain amount of shift in the threshold level of the sense amplifiers and the addressing transistors. This shift may be in a direction to reduce the noise immunity of the system to the point that the slightest perturbation causes an erroneous read out.

4. At low values of operating potential the number of erroneous read-outs increased.

The problems discussed above are overcome by the cross coupled flip-flop comprising two transistors R1 and R2. The operation of each memory cell when selected is as shown in FIG. 2. When Q is "high" the well defined "high" signal is applied to sense line 1. This potential is applied to the gate of N-type transistor R2 turning it fully on. Transistor R2 then clamps sense line 2 to ground potential. This is a positive clamping action. Sense line 2 is now connected to ground through the low "on" impedance of transistor R2. Any noise spike or capacitor discharge on the line is shunted to ground and the potential on sense line 2 can not rise appreciably above ground potential.

Alternately, if the $\overline{Q}$ output of the memory cell is high, then the potential on sense line 1 will be high and the high potential will be applied to the gate of transistor R1. Transistor R1 will then be turned on and provide a positive clamp between the sense line 1 and ground potential.

It should be appreciated that by using a single flip-flop (comprised of two transistors) per pair of complementary sense lines, a well defined level is achieved on both sense lines eliminating erroneous read outs.

The P-type addressing transistors could be replaced by N-type transistors. In such a case the addressing transistors coupling a sense line to a high output would operate in the source follower mode. The clamping transistors would then be of P-type conductivity and would be used to clamp one of the sense lines to the positive source of operating potential.

While in the present example the connections between a memory cell terminal and a sense line is via two series connected transmission gates, such as Q1*a* and X11*a*, in some arrays this is not essential. For example, the sense lines may be the column conductors themselves and in this case each such connection is via only a single transmission gate. Therefore, it should be appreciated that there can be a pair of sense lines per column or a pair of sense lines for a group of columns.

What is claimed is:

1. In combination with an array of memory cells, each cell having two terminals at which complementary signals are produced, each terminal connected through at least one single transmission gate transistor to a different one of two sense lines, said transistors operating in the common source mode when the signal at terminal represents one binary value and in the source follower mode when the signal at a terminal represents the other binary value, the improvement comprising:

first variable impedance means connected between one sense line and a point of reference potential for clamping said one sense line to said point of reference potential through a low impedance path in response to a signal representing said one binary value at the other sense line and for assuming a high impedance when the signal on said one sense line represents said one binary value; and second variable impedance means connected between the other sense line and said point of reference potential, for clamping said other sense line to said point of reference potential through a low impedance path in response to a signal representing said one binary value at said one sense line and for assuming a high impedance when the signal on said other sense line represents said one binary value.

2. The combination as claimed in claim 1 wherein each one of said variable impedance means includes a transistor having a conduction path and a control electrode for controlling the conductivity of said conduction path;

wherein the conduction path of a transistor is connected between a sense line and said point of reference potential and the control electrode is connected to another sense line; and wherein the potential at said point of reference potential represents said other binary value.

3. The combination as claimed in claim 2 wherein said transistors are insulated-gate field-effect transistors and form a cross coupled flip-flop responsive to the presence of said given signal condition on one of said sense lines.

4. In combination with a memory array of cells, each cell having two terminals for producing complementary output signals and each terminal coupled through at least one addressing transistor to one of a pair of sense lines, said addressing transistors operating in the common source mode when the signal at a terminal represents one binary value and in the source follower mode when the signal at a terminal represents the other binary value, the improvement comprising:

means for clamping the sense line whose associated addressing transistors operate in the source follower mode through a low impedance path to a point at a potential representing said other binary value including:

a. a pair of field effect transistors;

b. means coupling the source of said pair of transistors to said point of potential;

c. means coupling the gate of one transistor and the drain of the other transistor to one sense line; and d. means coupling the drain of said one transistor and the gate of the other transistor to the other sense line.

5. The combination comprising:

a memory cell having first and second output points for producing thereat complementary signals;

first and second sense lines;

a pair of transistors per sense line having their conduction paths connected in series between an output point and a sense line; for one signal condition said pair of transistors conduct in the source-follower mode whereby the signal coupled to the sense line is not tightly clamped to said output point and for another signal conduction said pair of transistors conduct in the common-source mode tightly clamping the sense line to said output point; and a pair of cross coupled transistors, the gate of one transistor and the drain of the other transistor being connected to one sense line, the gate of the other transistor and the drain of the one transistor being connected to the other sense line and the source of both transistors being connected to a point of reference potential.

6. In a memory having two sense lines, means for coupling one terminal of a memory location carrying a signal of one level to one line via two series connected transmission gates operating as source followers, and means for coupling a second terminal of that location carrying a signal at a different level to the other line via two series connected transmission gates operating in the common source mode, the improvement comprising:

means responsive to the signal level at said other line for clamping the signal level of said one line to said one level.

7. In the combination as set forth in claim 6, said last named means comprising a bistable circuit for producing two output signals, one at said one voltage level and the other at said other voltage level.

8. The combination of:

an array of memory cells, each cell having two output terminals, the first terminal of each cell producing an output signal and the other terminal a complementary output signal;

a plurality of pairs of conductors;

at each cell, a first transistor the conduction path of which connects one output terminal to one conductor of a pair and a second transistor the conduction path of which connects the other output terminal to the second conductor of said pair, whereby when both transistors of said cell are turned on, one transistor operates as a source follower and the other operates in the common source mode; and means responsive to the signal present on a conductor of a pair connected to a transistor operating in the common source mode for clamping the other conductor of that pair to the complementary signal level.

9. The combination as claimed in claim 8 wherein said signal responsive means includes first and second clamping transistors, wherein the conduction path of one transistor is connected between one conductor of a pair and a point at a potential representing said complementary signal level and wherein the conduction path of the other transistor is connected between the other conductor and said point of potential, and wherein the control electrode of said one transistor is connected to said other conductor and the control electrode of said other transistor is connected to said one conductor.

* * * * *